United States Patent [19]

Le Cucq et al.

[11] Patent Number: 5,084,872
[45] Date of Patent: Jan. 28, 1992

[54] INTERFACE FOR TRANSMIT AND RECEIVE MODE ACCESS TO THE SYNCHRONOUS TRANSMISSION MEDIUM OF A DISTRIBUTED SWITCHING NETWORK

[75] Inventors: Gérald Le Cucq, Maule; Abdelkrim Moulehiawy, Paris, both of France

[73] Assignee: Alcatel Business Systems, Paris, France

[21] Appl. No.: 540,258

[22] Filed: Jun. 19, 1990

[30] Foreign Application Priority Data

Jun. 19, 1989 [FR] France ................. 89 08113

[51] Int. Cl.5 .......................... H04J 3/02; H04J 3/24
[52] U.S. Cl. .................................. 370/94.2; 370/85.1; 370/85.9; 370/94.1
[58] Field of Search .............. 370/94.2, 94.3, 85.9, 370/85.1, 85.13, 94.1

[56] References Cited

U.S. PATENT DOCUMENTS

| 4,445,213 | 4/1984 | Baugh et al. | 370/94.2 |
| 4,608,685 | 8/1986 | Jain et al. | 370/94.2 |
| 4,761,781 | 8/1988 | Calvignac et al. | 370/94.2 |
| 4,787,082 | 11/1988 | Delaney et al. | 370/94.2 |

FOREIGN PATENT DOCUMENTS

| 122765 | 10/1984 | European Pat. Off. |
| 173274 | 3/1986 | European Pat. Off. |
| 27331 | 2/1982 | Japan. |
| 0216644 | 8/1989 | Japan | 370/94.2 |

Primary Examiner—Douglas W. Olms
Assistant Examiner—Dang Ton
Attorney, Agent, or Firm—Sughrue, Mion, Zinn, Macpeak & Seas

[57] ABSTRACT

Interface for transmit and receive mode access to the synchronous transmission medium of a distributed switching network. This interface for transmit and receive mode access to the synchronous transmission medium of a distributed switching system, the architecture of the network being based on a transmission medium time-shared between stations and each station comprising a device for determining the time positions corresponding to data to write to or to read from the medium, comprises in each station, for each transmission direction, a pair of memories one of which respectively accesses said medium in transmit mode and in receive mode synchronously with the presentation of the time positions to the medium while the other is respectively written or read under the control of the time position determining device, and vice versa.

6 Claims, 3 Drawing Sheets

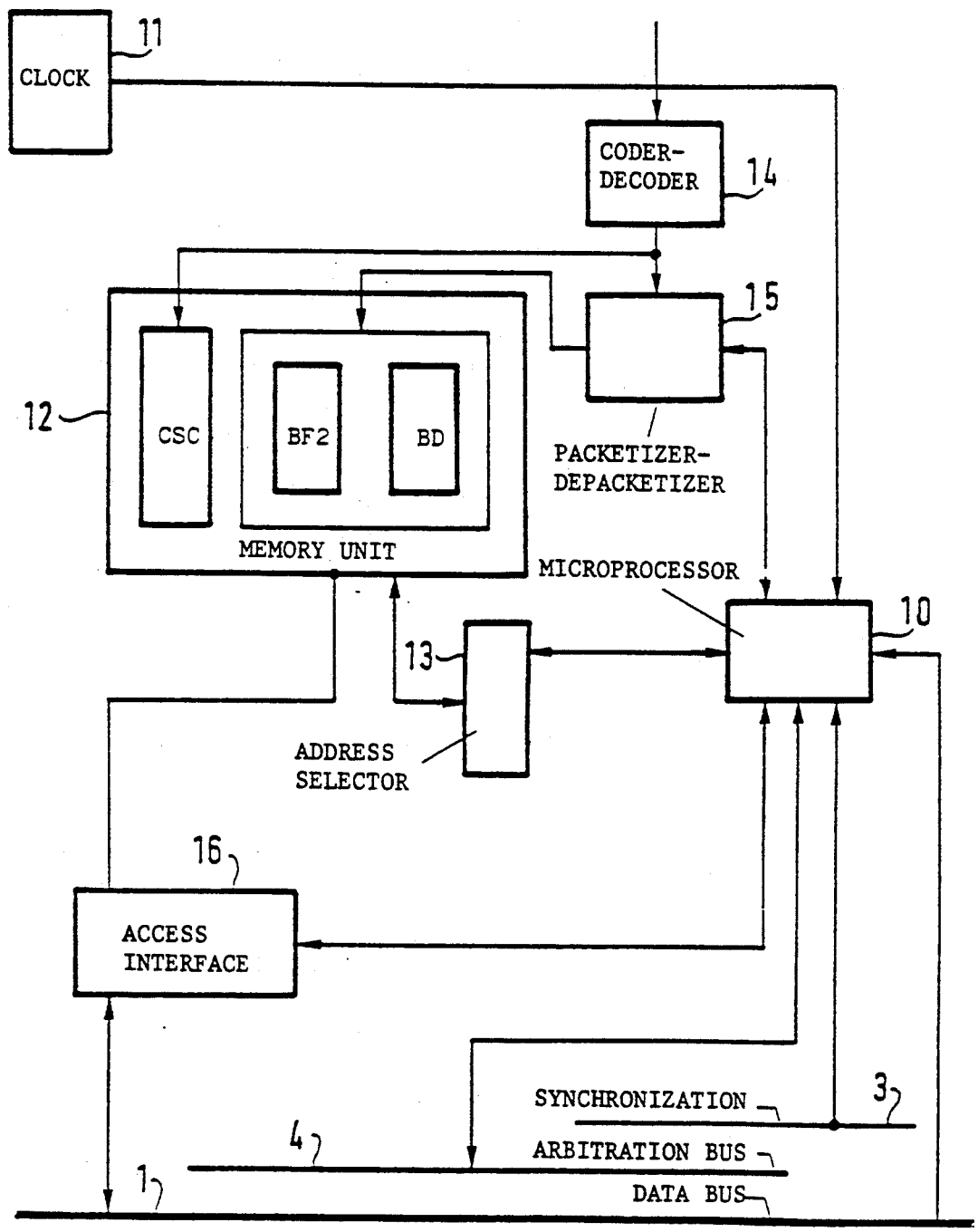

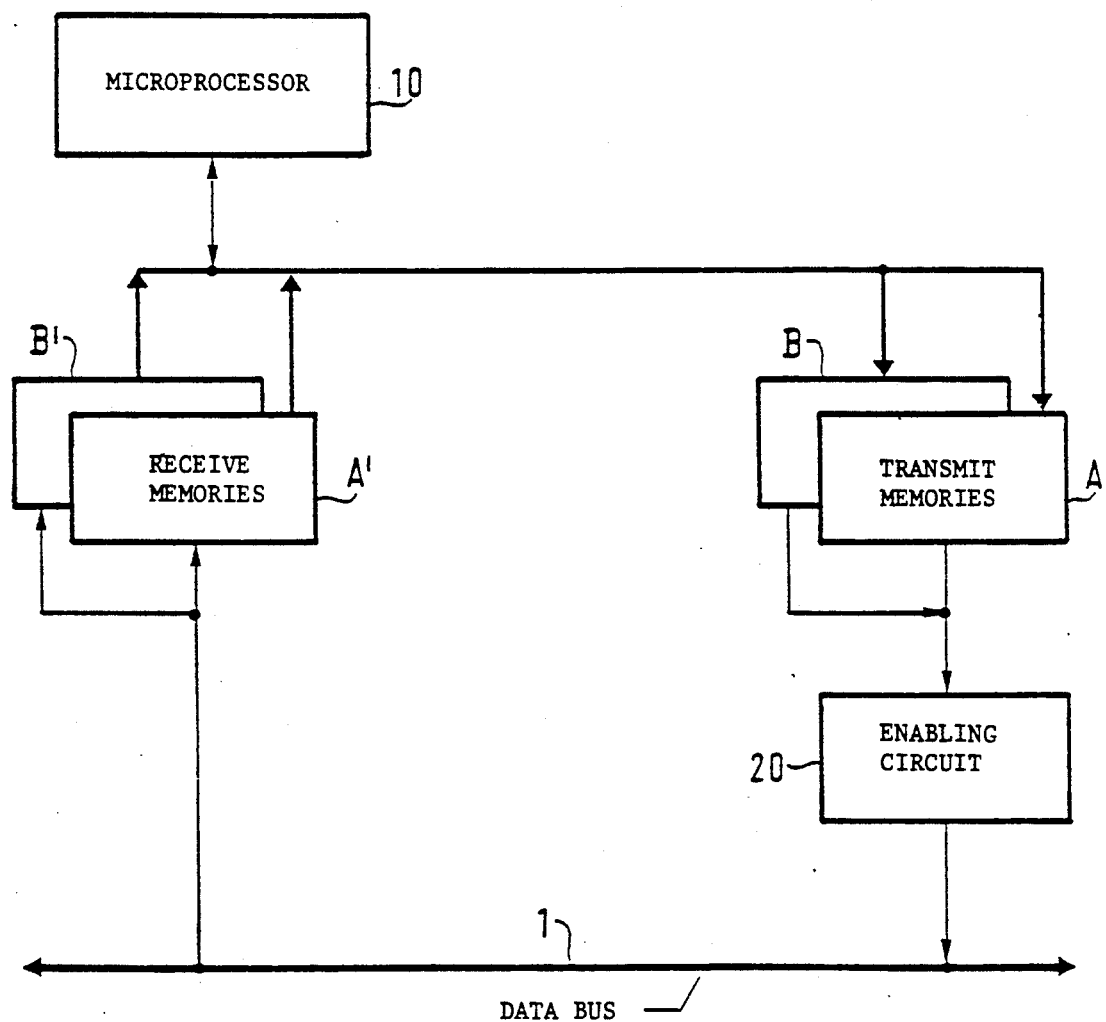

INTERFACE FOR TRANSMIT AND RECEIVE MODE ACCESS TO THE SYNCHRONOUS TRANSMISSION MEDIUM OF A DISTRIBUTED SWITCHING NETWORK

BACKGROUND OF THE INVENTION

The present invention concerns an interface for transmit and receive mode access to the synchronous transmission medium of a distributed switching network.

The present invention applies, for example, to a multiservice distributed switching network adapted to switch traffic in synchronous circuit-switched mode and in synchronous or asynchronous packet-switched mode, the architecture of said network being based on a transmission medium time-shared between different stations, in which:

the transmission medium is synchronous and structured in repetitive frames in turn structured in time slots in turn structured in time cells, the latter being sized to contain a communication entity which can be either a circuit-switched cell or a segmented packet-switched cell, an ideal time slot for access to the transmission medium in packet-switched mode is assigned to the respective stations communicating within the network by a centralized resource management system, in each time cell and for all stations transmission medium access arbitration is applied to procure access to this medium, in decreasing priority order, to circuit-switched cells available at this time in any station, to synchronous segmented packet-switched cells available at this time in any station having an ideal access time slot anterior to the time slot containing the time cell in question, to synchronous segmented packet-switched cells available at this time in the station having as its ideal access time slot the time slot containing the time cell in question, to asynchronous segmented packet-switched cells available at this time in any station having for its ideal access time slot a time slot anterior to the time slot containing the time cell in question, and to asynchronous segmented packet-switched cells available at this time in the station having for its ideal access time slot the time slot containing the time cell in question.

SUMMARY OF THE INVENTION

The present invention applies more particularly to the case where:

the time cells are in turn structured in time bytes;

each station constitutes a point of concentration for traffic of multiple users;

a transmission medium access time byte is assigned to respective users communicating in circuit-switched mode within the network by the centralised resource management system;

for each station authorised after arbitration to access the transmission medium in a specific time cell, the stations are successively enabled according to the various time bytes assigned to the various users which are connected to them in the case of circuit-switched mode traffic or one and the same station is enabled in the case of packet-switched mode traffic.

According to one characteristic of the invention, an interface for transmit and receive mode access to the synchronous transmission medium of a distributed switching network, the architecture of said network being based on a transmission medium time-shared between stations and each station comprising means for determining the time positions corresponding to data to write to or to read from said medium, comprises in each station, for each transmission direction, a pair of memories of which one respectively accesses said medium in transmit mode and in receive mode synchronously with the presentation of the time positions to said medium while the other is respectively written or read under the control of said time position determining means, and vice versa.

Other objects and characteristics of the present invention will emerge more clearly upon reading the following description of one embodiment given with reference to the appended drawings in which:

BRIEF DESCRIPTION OF THE DRAWING

FIG. 3 shows the general block diagram of a station in a network of this kind;

FIG. 4 shows an interface in accordance with the invention in a network of this kind.

DESCRIPTION OF DRAWING

Figure 1:
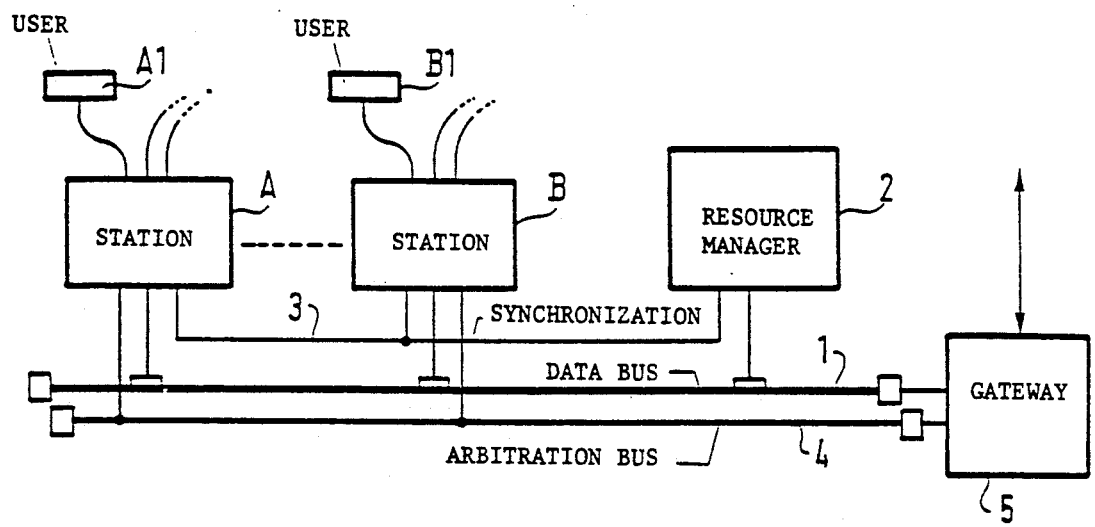
FIG. 1 shows the general block diagram of one example of a multiservice distributed switching network using an interface in accordance with the invention.

FIG. 1 shows a set of "n" stations A, B, C, D, etc of a distributed switching network communicating with each other by means of a transmission medium 1 referred to hereinafter as the data bus, time-shared between the various stations, each station itself constituting a point of concentration of traffic from various users A1, A2, etc, B1, B2, etc.

Figure 2:
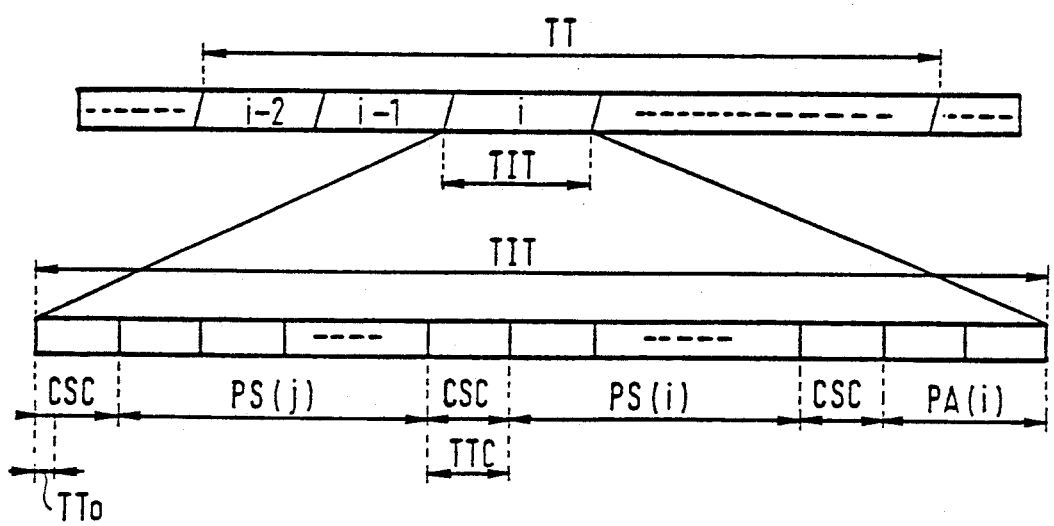
FIG. 2 shows one example of the structure of the transmission medium in a multiservice distributed switching network using an interface in accordance with the invention and one example of the assignment of traffic to this medium.

As shown in FIG. 2, the data bus is a synchronous bus structured in repetitive frames of duration $T_T$ in turn structured in time slots of duration $T_{IT}$ in turn divided into time cells of duration $T_{IC}$ in turn divided into elementary time bytes of duration $T_{TO}$.

Each time cell is sized to contain either a circuit-switched cell or a segmented packet-switched cell.

This network can service various types of traffic:

in synchronous circuit-switched mode, with a predetermined fixed data rate, for example 64 kbit/s for a 32-channel PCM voice multiplex, the speech information carried by the voice multiplex constituting said circuit-switched cells, in synchronous packet-switched mode, with a varied and varying data rate, for example information from facsimile terminals, in asynchronous packet-switched mode, for example information from computer terminals.

The expression "segmented packet-switched cells" means fragments of packets each including the destination address of the packet and being the same size as a circuit-switched cell.

A circuit-switched cell or a packet-switched cell being made up of bytes, each time byte is sized to contain a byte.

The various bytes of the same circuit-switched cell are assigned to the various network users and consequently to the various stations to which these users are connected by a centralized resource management system 2 as circuit-switched mode calls originate and terminate in the network.

For each time cell on the data bus the circuit-switched cells take priority so that this type of traffic can be carried without delays.

The packet-switched mode traffic relating to a station I is theoretically carried by a time slot $IT_i$ of the same rank i in successive frames, called the ideal access time slot of the station concerned, allocated to it beforehand by the centralized resource management system 2 according to the capacity of the transmission medium, the nominal capacity already allocated to calls in progress at a given time and the nominal capacity required by the station requesting access to the network at this time, so that all the traffic corresponding to these nominal capacities can be carried without delays.

The efficiency with which the transmission medium is used is optimized by allowing synchronous packet-switched mode traffic from a station to "spill over" into cells of time slots not initially assigned to this station, in the event of synchronous packet-switched mode traffic "peaks" (as compared with the allocated nominal capacity), and by providing also for asynchronous traffic to "fill in" cells not occupied by synchronous traffic, in the event of synchronous traffic "troughs".

In each time cell and for all stations transmission medium access arbitration is therefore applied to procure access to this medium, in decreasing priority order, to circuit-switched cells CSC available at this time in any station, to synchronous segmented packet-switched cell PS (j) available at this time in any station having an ideal access time slot anterior to the time slot containing the time cell in question, to synchronous segmented packet-switched cell PS (i) available at this time in the station having for its ideal access time slot the time slot containing the time cell in question, to asynchronous segmented packet-switched cells PA (j) available at this time in any station having for its ideal access time slot a time slot anterior to the time slot containing the time cell in question, and to asynchronous segmented packet-switched cells PA (i) available at this time in the station having for its ideal access time slot the time slot containing the time cell in question.

What is more, for any station authorised after arbitration to access the transmission medium in a specific time cell, these stations are successively enabled according to the time bytes assigned to them in the case of circuit-switched mode traffic or one and the same station is enabled throughout the time cell in question in the case of packet-switched mode traffic.

There will now be described with reference to FIG. 3 the block diagram of each station of a network of this kind.

The block diagram is based on a microprocessor 10 which communicates with various components including:

a clock 11 supplying it with the repetition frequency of time cells, time slots and frames on the data bus, a synchronization link 3 supplying to it the transmit mode ideal access time slot in the case of packet-switched mode traffic and the assigned time bytes in the case of circuit-switched mode traffic, this information being provided by the centralised resource management system 2, the data bus 1 supplying to it in so-called signalling cells the time bytes assigned to the corresponding sending station in the case of receive mode access and in the case of circuit-switched mode traffic, an arbitration bus 4 common to the various stations, a memory 12 containing registers (or buffers) dedicated to each type of traffic, with which it communicates via an address selector 13.

Data is written into or read from these buffers by a coder-decoder (or codec) 14 in the case of circuit-switched mode traffic or a packetizer-depacketizer 15 in the case of packet-switched mode traffic.

The coder-decoder and the packetizer-depacketizer are well known in themselves and will not be described here. Suffice to say that a packetizer forms data into packets comprising data to be transmitted and signalling information for routing it and that a coder assembles speech bytes from the various users connected to the station concerned to form a PCM voice multiplex, the signalling information being transmitted separately from the speech information (or bytes); a decoder and a depacketizer carry out the reverse functions.

Arbitration information applied to the arbitration bus 4 relates to the priority of the traffic in the buffers of the memory 12 detected as occupied by the microprocessor 10 via the address selector 13.

Arbitration is carried out by comparing the arbitration information applied to the arbitration bus at the same time by the various stations.

To be more precise, arbitration is carried out by writing the bus followed by reading it, any coincidence of the information written then read by a station on the arbitration bus indicating settling of the contention in favor of that station. In this instance, as writing to the arbitration bus means that the bus changes state on application of a "0" bit, the address regarded as having the highest priority after subsequent reading of the bus is that having the greatest number of "0" bits, and the arbitration information concerning the priority of the various buffers is derived accordingly.

The arbitration information relating to the buffers dedicated to packet-switched mode traffic includes, in addition to information relating to the priority of the buffers, information indicating the seniority of the traffic to be serviced.

This can be obtained simply by adding to the information relating to the priority of this type of traffic information encoding the ideal access time of the station originating this traffic, in this instance by means of a code comprising the greatest number of "0" bits for the most senior ideal access time.

The microprocessor 10 of each station knows the ideal access time slot of the station, which is communicated to it by the centralized resource management system 2 via the synchronization link 3 (FIG. 1).

The microprocessor 10 of a station uses the result of arbitration to select the address of the buffer of that station regarded as having the highest priority after arbitration.

There will now be described with reference to FIG. 4 the interface 16 used by each station to access the data bus in write (transmit) mode and read (receive) mode, this interface being located between the microprocessor 10 and the data bus 1 shown in FIG. 3.

The interface comprises a pair of memories A-B for writing to the data bus and a pair of memories A'-B' or reading from the data bus. The data in these memories is organised in bytes, consecutive bytes on the bus occupying consecutive addresses in these memories.

Each pair of memories provides the necessary adaptation between the data rate on the data bus and the speed at which the microprocesor 10 processes the data to be written to the bus or the data read from it.

Thus to write to the bus the content of one of these memories (memory A, for example) is "dumped" onto the bus while the other memory (B) is being written by the microprocessor, and vice versa, the memories being switched over at the time slot frequency, each memory A and B being sized to contain one time slot (the arbitration governing transmit mode access being carried out at the time slot scale, as previously explained).

To be more precise, the writing in each station of the memory not assigned to access to the bus in a given time slot is effected under the control of the microprocessor, time byte by time byte, using the data stored in the register of the memory 12 selected after the arbitration and enabling processes described above and at addresses corresponding to the time bytes in question, while the memory assigned to access to the bus in the same time slot is read sequentially, also under the control of the microprocessor, and synchronously with the presentation of the time bytes to the bus.

At each address of the memory not assigned to bus access is written, also under the control of the microprocessor, a ninth bit called the bus access enabling bit which guarantees access to the bus only if the corresponding time byte is assigned to this station after the arbitration and enabling processes previously described, this bit being read before any access to the bus in the time byte in question by a circuit 20 for enabling access to the bus in transmit mode.

Similarly, when reading the bus, while one of the memories (memory A', for example) is accessing the bus the other memory (B') is read by the microprocessor, and vice versa, the memories being switched over at the time slot frequency, each memory being sized to contain a time slot which may be different to the receive time slot of the station concerned (the sending station connected to the receiving station having an actual access time slot which may be different from its ideal access time slot).

To be more precise, in the memory assigned to bus access in a given time slot is written in sequence all the data contained in this time slot, byte by byte, under the control of the microprocessor and at addresses corresponding to the position of these bytes on the data bus within the time slot concerned. During this time the memory not assigned to bus access is read by the microprocessor 10 at addresses selected as being those corresponding to the time bytes assigned to the corresponding sending station.

These time bytes are communicated to the microprocessor via the data bus 1 by the centralised resource management system (FIG. 1) which also processes the signalling information in the case of circuit-switched mode traffic, according to basic principles which are well known in themselves and will not be described here.

In the case of packet-switched mode traffic, scanning the starts of packets enables each station to determine whether a packet is intended for it and to respond to it on behalf of the user concerned.

The data read in this way by the microprocessor is stored in registers of the memory 12 similar to those described above for write mode access.

We claim:

1. An interface for transmit and receive mode access to a synchronous transmission medium of a distributed switching network, the architecture of said network being based on a transmission medium time-shared between stations, with each station transmitting to other stations over said transmission medium by writing data to said transmission medium and receiving from other stations by reading data from said transmission medium, and each station comprising means for determining time positions for writing data to said medium or reading data from said medium, said interface comprising a transmit pair of memories and a receive pair of memories in each station, one of said transmit pair of memories accessing said medium in transmit mode while the other of said transmit pair of memories is written to by its station, and vice versa, under control of said time position determining means and in synchronism with the presentation of the time positions to said medium, and one of said receive pair of memories accessing said medium in receive mode while the other of said receive pair of memories is read by its station, and vice versa, under control of said time position determining means and in synchronism with the presentation of the time positions to said medium.

2. An interface according to claim 1 characterized in that at each address of the memories used for transmit mode access, said address corresponding to a time position on the transmission medium, there is stored a bit to enable access to said medium at the time position in question, said bit being written under the control of the time position determining means.

3. Interface according to claim 1 or claim 2 characterized in that said network is adapted to switch traffic in synchronous circuit-switched mode and in synchronous or asynchronous packet-switched mode, said transmission medium is structured in repetitive frames in turn structured in time slots in turn structured in time cells, the latter being sized to contain a communication entity which can be either a circuit-switched cell or a segmented packet-switched cell, and the time cells are in turn structured in time bytes which constitute said time positions.

4. An interface according to claim 3 characterized in that, a nominal time slot for transmit mode access to the transmission medium in packet-switched mode is assigned to the respective stations communicating within the network, and a medium access time byte is assigned to respective stations communicating in circuit-switched mode or to one and the same station communicating in packet-switched mode within the network, and wherein the means for determining said time positions for transmit mode access comprise:

means whereby in a given time cell and for all stations transmission medium access arbitration is applied to procure access to said medium, in decreasing priority order, to circuit-switched cells available during said given time cell in any station, to segmented packet-switched cells available during said given time cell in any station having a nominal access time slot anterior to the time slot containing the given time cell, to synchronous segmented packet-switched cells available during said given time cell in the station having as its nominal access time slot the time slot containing the given time cell, to asynchronous segmented packet-switched cells available during said given time cell in any station having for its nominal access time slot a time slot anterior to the time slot containing the given time cell, and to asynchronous segmented packet-switched cells available during said given time cell in the station having for its nominal access time slot the time slot containing the given time cell, and means for enabling stations authorized after arbitration to access the transmission medium according to the time bytes assigned to them according to the type of traffic.

5. Interface according to claim 4 characterized in that the memories used for transmit mode access are sized to contain a time slot and are switched at the time slot frequency.

6. Interface according to claim 4 characterized in that the memories used for receive mode access are sized to contain a time slot and are switched at the time slot frequency.

* * * * *